United States Patent [19]

Henderson

[11] 4,321,766

[45] Mar. 30, 1982

[54] TROTLINERS AID

[76] Inventor: Homer I. Henderson, 2220 Live Oak St., San Angelo, Tex. 76901

[21] Appl. No.: 227,399

[22] Filed: Jan. 22, 1981

Related U.S. Application Data

[63] Continuation-in-part of Ser. No. 69,117, Aug. 23, 1979, abandoned.

[51] Int. Cl.³ ............................................. A01K 79/00
[52] U.S. Cl. ............................................. 43/4; 43/6.5; 43/27.4
[58] Field of Search ................ 43/27.4, 6.5, 4, 54.5 A; 254/190 R, 137; 9/1.7

[56] References Cited

U.S. PATENT DOCUMENTS

| | | | |
|---|---|---|---|
| 2,608,174 | 8/1952 | Sponenburg | 254/391 |
| 3,626,627 | 12/1971 | Osborne | 43/27.4 |
| 3,654,721 | 4/1972 | Coleman | 43/27.4 |
| 3,664,637 | 5/1972 | Troiano | 254/398 |
| 3,896,579 | 7/1975 | Benne | 43/27.4 |

FOREIGN PATENT DOCUMENTS 1319386  6/1973  United Kingdom ................. 43/27.4

*Primary Examiner*—Nicholas P. Godici

[57] ABSTRACT

This invention comprises an arm that projects outwardly from the boat and has trotline holding means thereon which can hold the trotline external of the boat, and below the boat's gunwale, thereby preventing the hook-carrying line from entering the boat, or passing over, or under the boat. Consequently, the cause of most hookings, is eliminated. This makes trotline fishing safer, easier, more fish productive, and more enjoyable.

2 Claims, 11 Drawing Figures

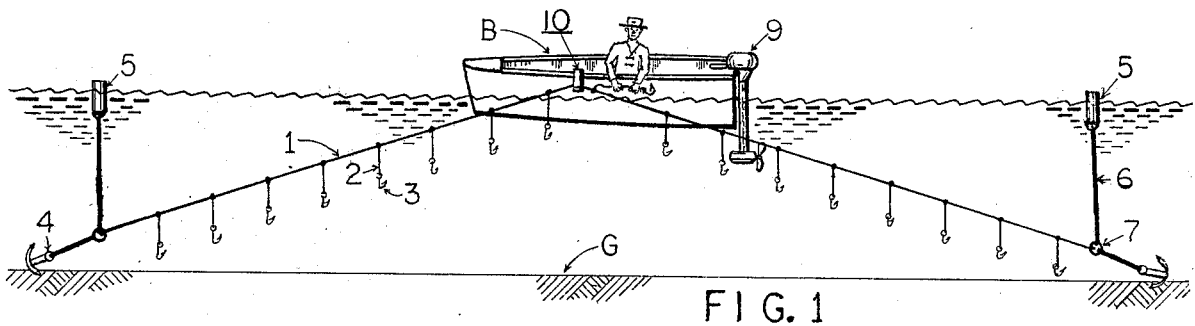
FIG. 1
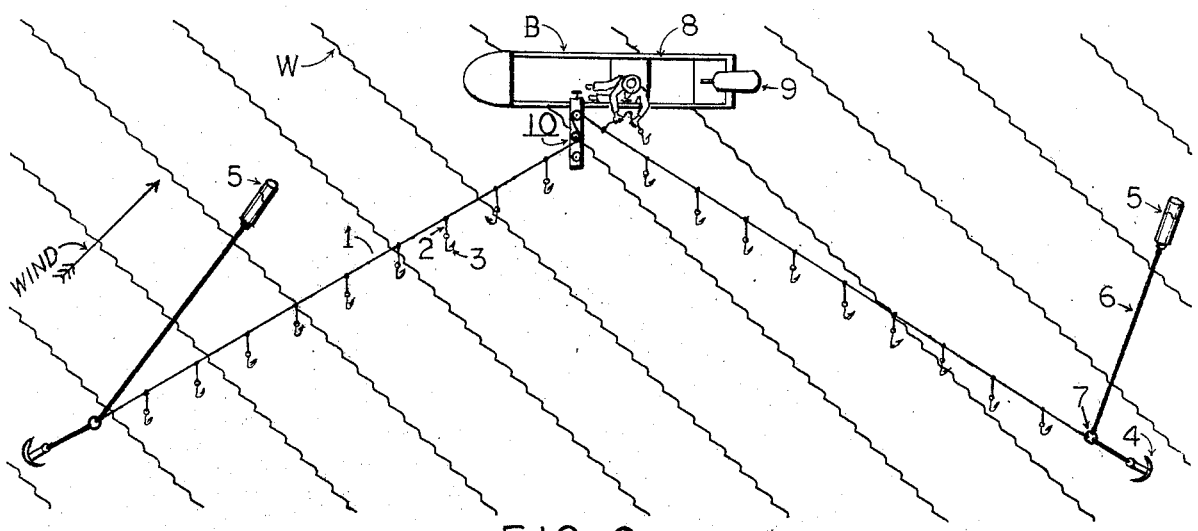
FIG. 2
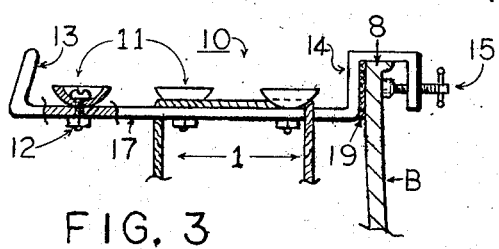
FIG. 3
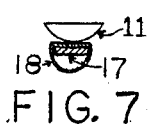
FIG. 7
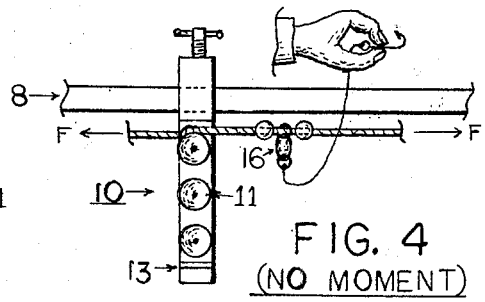
FIG. 4
(NO MOMENT)
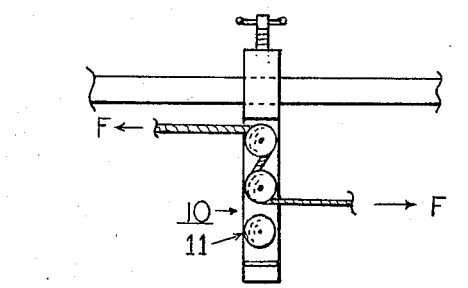
FIG. 5
(CLOCKWISE MOMENT)
FIG. 6
(COUNTERCLOCKWISE MOMENT)

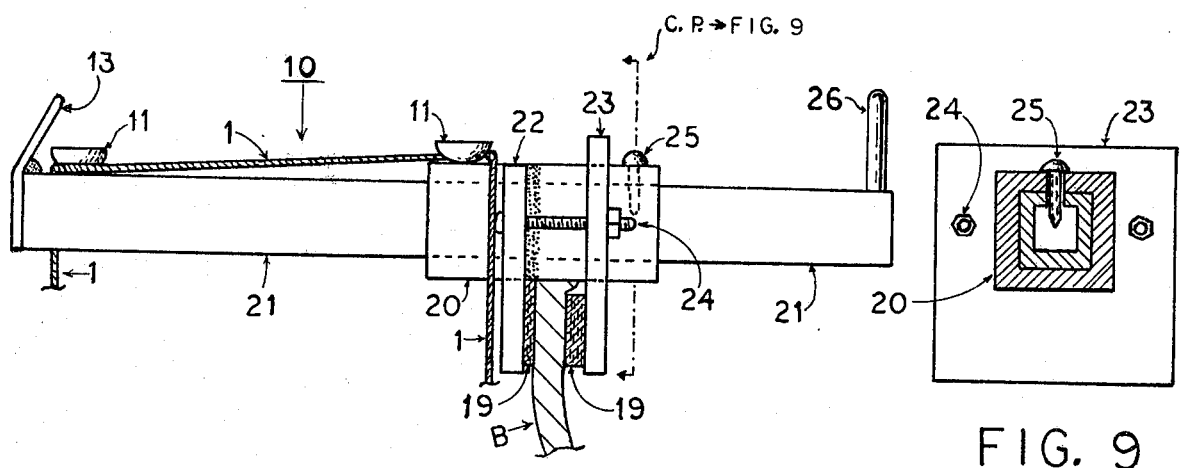
FIG. 8
FIG. 9
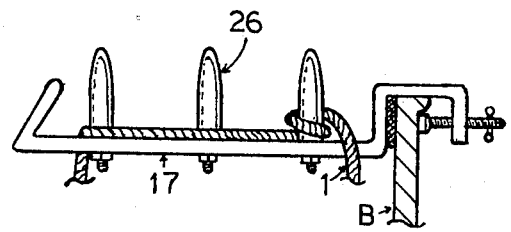
FIG. 10
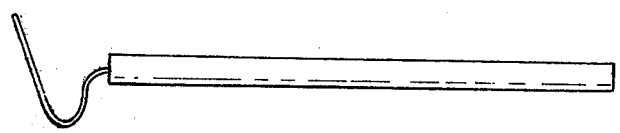
FIG. 11

TROTLINERS AID

CROSS REFERENCE TO RELATED APPLICATIONS

This application is a continuation-in-part of Ser. No. 69,117 filed Aug. 23, 1979 now abandoned.

SUMMARY OF THE INVENTION

This invention is not an improvement of the trotline, per se, but it is a device that aids the Trotliner, and it makes trotlining much safer, with less work, therefore a more relaxed Trotliner, hence more methodical and less accident prone, and it contributes to more pleasure, and more fish on the stringer.

Heretofore, the setting of a trotline, and or the servicing of a previously set trotline to remove hooked fish and rebait bare hooks, was a tiring task. At each hook the Trotliner had to hold his boat, and hold the trotline, remove a hooked fish, rebait bare hooks, and he with only two hands. When the wind is blowing his task is increased many fold, as is the possibility of injury. The inboard surfaces of a boat are usually wet and very slippery, making slip falls a common occurance. This present invention is a simple arm that is attached to the side of the boat, and projects outwardly from the boat, and carries multiple, spaced, friction devices to hold the trotline at the Trotliners's discretion. For safety's sake, it holds the trotline below the gunwale of the boat, and in windy weather it can cause favorable turning moments on the boat, as desired by the Trotliner, to keep his boat parallel with the trotline's setting, which is very desirable safetywise, as well as expediting the servicing of said trotline.

BRIEF DESCRIPTION OF THE DRAWINGS

FIG. 1 is an elevational view, showing a Trotliner in his fishing boat, over water, and with his unbaited trotline secured to the side of his boat by the Trotliner's Aid.

FIG. 2 is a plan view of FIG. 1, showing the direction of the wind, and the waves generated thereby. It also shows how this invention develops a counter moment to resist the wind's turning moment on the boat, thereby keeping the boat parallel with the previously set, taut trotline, which is highly desirable.

FIG. 3 is an elevational view of an Aid, attached to the side of a boat, showing the plurality of line-holding cups that hold the line in place on the Aid, and frictionally restrains the line from slipping, and because of their spacings can generate favorable rotational moments on the boat, to counter unfavorable moments generated by the wind.

FIG. 4 is a plan view with the Aid holding the trotline without generating any moment on the boat.

FIG. 5 is a plan view of the Aid, attached to the windward side of a boat and generating a clockwise moment on the boat.

FIG. 6 is a plan view of the Aid, attached to the windward side of a boat and generating a counterclockwise moment on the boat.

FIG. 7 is a sectional view of the AID's boat-arm when a tube is placed over the bar to prevent hooks from fouling on said bar.

FIG. 8 is an elevational view, showing a modified form of the Aid, wherein a pair of telescoping tubes, replace the single unit boat-arm.

FIG. 9 is a sectional view of the telescoped tubes of FIG. 8.

FIG. 10 is a modification of the frictional restraining cups.

FIG. 11 is not a part of this invention; showing a conventional tool useful in manipulating off-boat trotlines. This tool is a "Boat Hook", conventional on boats, to recover floating objects fallen overboard, hold a boat to a second boat or fixed object, to recover dropped trotlines, to place a trotline in off-boat receptacles, etc.

BODY OF THE SPECIFICATION

Referring to FIG. 1, it shows the Aid device 10, attached to the windward side of the boat B. The trotline 1, had been previously set with the anchors 4, to hold it securely in place. A buoy 5 is above each anchor, and is secured thereto by the rope 6. This strong rope 6, is required because the heavy anchors 4 often become imbedded in the water's ground G. The trotline 1, has its normal large number of fish hooks 3, secured to the line 1, by the drop cord 2. (The combination of the drop cord 2, and the hook 3, is usually termed a "stageing"). It will be noted that the AID 10, holds the trotline 1, below the gunwale of the boat; this is highly desirable safety-wise, compared to conventional equipment wherein the trotline, with staging and hooked fish is brought over the gunwale, often into the Trotliner's lap. The Trotliner must remove the frantic, flopping fish with one hand, while with the other he must hold the boat, should the weather be windy. Also, it is quite difficult to hold the boat with one hand and try to rebait a hook with the other, and it is dangerous. With the Trotliner's Aid, the procedure is safe and even pleasant: (1) the Trotliner tows his boat to within netting distance of the hooked fish; (2) he anchors his boat to the AID; (3) he slowly lowers his net, and nets his fish; (4) he brings the net and fish into the boat; (5) he removes the fish and places it on a stringer; (6) he rebaits the staging, frees the boat from the AID, and proceeds to the next staging. All of the above actions are deliberate, with both hands in the action, with no hooked hands, no lost fish, no lost time, and more fish on the stringer. Further, this invention prevents the trotline from getting under the boat, therefore no fouling of the line on the motor, and no wrapping of the line on the propellor shaft.

FIG. 2, shows a plan view with a Trotliner in his boat, on water, and with the wind blowing at 45 degrees, relative to the trotline set, nevertheless, the Aid holds the boat parallel to the trotline set. The Trotliner is calmly baiting his hooks, he has learned that the Aid substantially makes the boat, the Aid, and the trotline on the boat-arm, into a single unit, that is: no relative movement, regardless of wind waves, or speed boat waves, or trotline jerks by large hooked fish. In this figure the Aid is attached to the boat forward of the center of the boat, consequently much more wind-surface to the rear of the Aid, than there is forward, thereof. This imposes a counterclockwise torque (looking down) on the boat; this is countered by the clockwise line winding on the Aid, as shown in FIGS. 2, 3 and 5.

FIG. 3, is an elevational view of the Aid 10, attached to the gunwale 8, of the boat B. The Aid may be made of a bar of metal sufficiently long to form the clamping-U, 14, and the boat-arm 17, with the outboard end 13, turned upward to prevent the trotline from falling-off the boat arm. Mounted on the boat-arm 17, are three bowls 11. These bowls are frictional restraining elements to prevent the line 1, from slipping relative to the boat-arm 17. As shown, these bowls have a flat bottom, and they are mounted, bottom-down, thereby forming a relatively long vee between the bar and the bottom of the bowl. As the line is pulled into this vee, it is squeezed more and more as the tension increases on said line, thereby increasing greatly the friction on said line.

FIG. 4, is a plan view of an Aid attached to a boat, and the line wound on the Aid when no turning moment is desired, as when there is no wind, or when the wind is parallel with the trotline set. As shown, there may be considerable force on the line, but none on the hook-carrying stageing 16.

FIG. 5, is a plan view to illustrate the magnitude of the torque obtained under the conditions of FIG. 2. The torque arm is the distance across the two bowls: $L_1$, as shown, and the line tension, or force is F, therefore the torque is the product; $FL_1$. Had the line been wound around the three bowls, the torque would have doubled; $FL_2$.

FIG. 6, is the same as FIG. 5, except the line is wound to produce counterclockwise torque, or moment.

FIG. 7, shows a means to prevent hooks from fouling on the bar 17. A thin wall tubing 18, with its upper surface flattened, is slipped over the bar 17. This is a non-essential, but it does avoid an occasional hangup.

FIG. 8, is a modification, wherein the bar 17, is replaced with a pair of telescoping tubes. This is desirable in high wind conditions whereupon a long torque arm is needed to keep the boat parallel with the set, requiring the Trotliner to lean overboard to service the line 1, in the furthest outboard local 11. The said tubes may be round or square, as shown. The larger tube may be clamped to the gunwale as shown. The larger tube, 20, has a bowl 11 mounted on its out-board end. The clamp comprises the plate 22, welded to the larger tube, and with an adjustable plate 23, serving as the clamp by means of the screws 24. The rod 26 is the operating handle. The inner tube 21, has a bowl 11, on its outer end, permitting the inner tube to be telescoped inwardly until the bowls on the two tubes are nearly touching each other. The line 1 can then be placed outboard-wise on the inner tubes bowl 11, and said tube telescoped outboardly to obtain the desired torque-arm length, whereupon the locking pin 25, is placed in holes of each tube. There is only one locking hole in the larger tube, as shown in FIG. 9. The inner tube has many holes, spaced at desired intervals. The inner tube is scribed on its upper surface, to indicate that holes in the two tubes are in alignment, when the smaller tube has a scribed line at the inboard end of the outer tube.

FIG. 9 is a sectional view of the dual tubes of FIG. 8, taken on sectional, cutting plane as shown in FIG. 8.

FIG. 10 is the same as FIG. 3, except the frictional restraining bowls 11, of FIG 3, have been replaced with pegs 26. This modification is for small boats. The friction between the pegs 26 and the line 1, is much lower than when the bowls 11 are used, but suffices for small boats that do not venture out when the weather is bad. Multiple wraps of the line on the pegs increases the friction, useful to hold the boat while the Trotliner services each staging.

Having described my invention, I claim:

1. A trotliner's aid comprising a boat arm mounted to and extending laterally outwardly from the Trotliner's boat, said boat arm having multiple line retaining means rigidly and nonrotatably mounted thereon, each line retaining means extending a different distance from the boat, each line retaining means comprising a fixed semi-spherical bowl rigidly mounted on a flat surface of said boat arm, the lower part of said bowl forming a full circle V-shaped groove between said bowl and said flat surface, said groove being free of any line-destructive sharp edges, whereby when said trotline is wrapped around said line retaining means and is pulled into said groove it is frictionally held in said V-shaped groove.

2. A trotliner's aid comprising; a first shout section of stationary pipe, mounted transversely on the gunwhole of the trotliner's boat, said pipe having fixed on the outer end of it's upper surface a non-rotating frictional line retaining means; a second section of pipe, somewhat smaller in diameter than said first pipe, mounted within said first pipe permitting it to telescope freely; said second section of pipe, and having both outboard and inboard ends projecting beyond the ends of said first section of pipe, said second pipe having a non-rotation frictional line retaining means rigidly mounted on its outboard end; said inboard end of said second pipe having attached thereto an upright telescope-operating handle, to enable the trotliner to adjust the second pipe's outboard end to the desired distance from the boat; and locking means on the first section of pipe, to lock the second pipe to the first pipe at any desired position.

* * * * *